United States Patent [19]

Baues et al.

[11] 3,995,937
[45] Dec. 7, 1976

[54] TUNABLE OPTICAL WAVE GUIDE SYSTEMS

[75] Inventors: Peter Baues, Krailling; Hans Mahlein, Munich; Achim Reichelt, Munich; Gerhard Winzer, Munich, all of Germany

[73] Assignee: Siemens Aktiengesellschaft, Berlin & Munich, Germany

[22] Filed: Sept. 3, 1975

[21] Appl. No.: 609,909

[30] Foreign Application Priority Data

Sept. 6, 1974 Germany .......................... 2442652

[52] U.S. Cl. ..................... 350/96 WG; 350/160 LC
[51] Int. Cl.² ......................................... G02B 5/14
[58] Field of Search ................. 350/96 WG, 160 LC

[56] References Cited
UNITED STATES PATENTS

| | | |
|---|---|---|
| 3,814,498 | 6/1974 | Tomlinson et al. .......... 350/96 WG |
| 3,944,326 | 3/1976 | Tacke et al. ................. 350/96 WG |

OTHER PUBLICATIONS

Fox, A. J. "The Grating Guide — A Component for Integrated Optics" Proc. of the IEEE, May 1974, pp. 644–645.

*Primary Examiner*—John K. Corbin
*Assistant Examiner*—Rolf Hille
*Attorney, Agent, or Firm*—Hill, Gross, Simpson, Van Santen, Steadman, Chiara & Simpson

[57] ABSTRACT

Optical waveguide systems useful as frequency-selective reflectors, filters, or resonators. Each system utilizes at least one grid fan means having elongated grating strips arranged in a fan-like manner and adapted to have a continuously variable grating constant. At least one waveguide is spatially located in adjacent relationship to a given grid fan in each system.

29 Claims, 11 Drawing Figures

TUNABLE OPTICAL WAVE GUIDE SYSTEMS

BACKGROUND OF THE INVENTION

The utilization of dielectric multilayer systems in the construction of macroscopic interference filters and reflectors is known, as is the utilization of rigid gravity structures having precisely defined grating constants as resonators in waveguide systems for lasers.

A shortcoming of these last-cited structures is, above all, the inherent problem of achieving a precise, desired grating constant in a particular such structure owing to the characteristics of the materials used for grating structure construction.

In the case of optical communications transmission equipment utilizing semiconductor laser transmitters, the wide band emission spectrum of these lasers in relation to the desired high data transmission rates is also disadvantageous.

BRIEF SUMMARY OF THE INVENTION

The present invention relates to tunable optical waveguide systems adapted for use as frequency-selective reflectors, filters, or resonators.

More particularly, this invention is directed to optical waveguide apparatus which overcomes the problems and shortcomings of the prior art and which employs elongated grating strips arranged in a fan-like manner and adapted to have a continuously variable grating constant. The grating strips are characteristically so located or oriented relative to one another in a given embodiment that their individual respective center lines, when projected or extrapolated, converge at one point in space. Individual fan strips are fan shaped and constitute refractive index variations impressed or electro-optically induced in a light-conductive material. The grating strips and light-conductive material employed in a given embodiment can be termed, for convenience, a grid fan.

At least one waveguide is spatially located in adjacent relationship to a given grid fan so as to extend across the grating strips thereof. The distance between each such waveguide and one face of such grid fan should be as small as possible preferably.

In one preferred mode, apparatus of this invention functions as a couplable or switchable narrow band interference filter for integrated optical arrangements. Here, two grid fans are employed in spaced, parallel relationship to each other with the distance therebetween being an integral multiple of one half the wavelength of the particular light which it is desired to utilize. With such mode, a narrow spectral region or band can be filtered out from a given emission band of a wide band emission spectrum, for example. Also, such mode can be used as a resonator in waveguide systems for lasers; such arrangement makes possible an easy adjustment of the resonance frequency to the fluorescence line width of the laser.

The invention further relates to processes for making and using such optical waveguie apparatus.

An object of the present invention is to provide a subassembly suitable for use in optical waveguide components which serve such purposes as frequency-selective reflectors, filters, resonators or the like, such subassembly employing spatially alternating periodic or non-periodic grating strips in a light conductive material.

Another object is to provide devices utilizing such a sub-assembly which devices are suitable for use as optical waveguide components.

Another object is to provide optical waveguie components which overcome prior art shortcomings utilizing such a sub-assembly.

Another object is to provide processes for making and using new and improved optical waveguide components and sub-assemblies therefor.

Other and further aims, objects, purposes, advantages, uses, and the like for the present invention will be apparent to those skilled in the art from the present specification.

DETAILED DESCRIPTION

In practicing the teachings of this invention, it is preferred to have each waveguide used be so oriented relative to an associated grid fan that it transverses each grating strip vertically (perpendicularly).

Figure 1A:
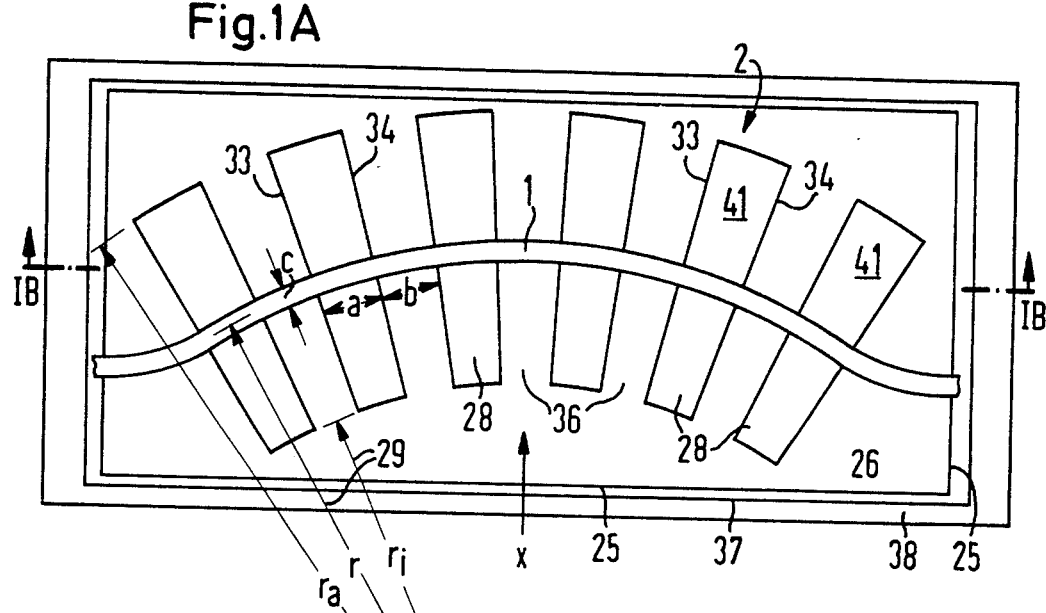
FIG. 1A is a fragmentary, diagrammatic plan view of one embodiment of optical waveguide apparatus of the present invention, such apparatus utilizing one embodiment of a grid fan of the present invention in combination with a waveguide.
Figure 1B:
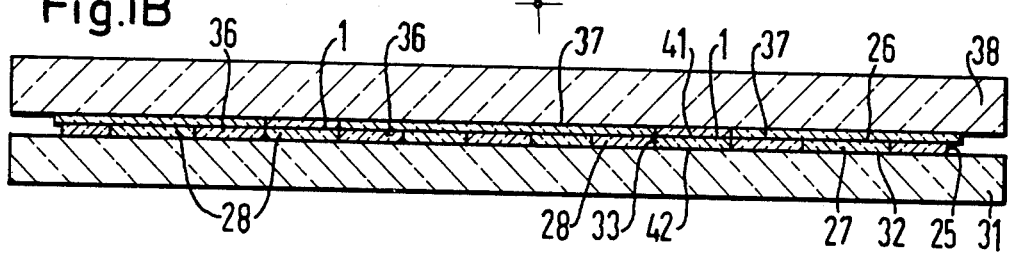
FIG. 1B is a vertical sectional view taken along the line 1B—1B of FIG. 1A.

Referring to FIGS. 1A and 1B there is seen an embodiment of apparatus of this invention. Such apparatus employs as one sub-assembly thereof an arrangement of elements which is herein termed generically a grid fan and which is herein designated in its entirety by the numeral 2. Grid fan 2 is shown in combination with a waveguide 1. Grid fan 2 can be regarded as comprising a substantially planar, light transmissive continuous layer 25 having a pair of spaced, opposed, parallel faces 26 and 27. The layer 25 has a generally uniform index of refraction. A plurality of elongated regions of grating strips 28 are each defined in the layer 25.

Each one of the regions 28 generally has a hypothetical center line 29, all said center lines 29 being adapted to extend through a common point designated Z upon extrapolation. The regions 28 are generally in circumferentially spaced, adjacent, substantially co-planar relationship to one another. Each one of the regions 28 has an index of refraction which is either greater than or less than the index of refraction of the layer 25. All of the regions 28 have a substantially similar index of refraction relative to one another.

Layer 25 is preferably, and as shown in FIGS. 1A and 1B supported by a solid substrate 31. Substrate 31 has an index of refraction which is less than that of the layer 25. In grid fan 2, the layer 25 is a solid, and one of the faces thereof, here face 27, is continuously adhered to a substantially planar surface 32 of the substrate 31. In grid fan 2, the layer 25 can have a thickness transversely measured between the faces 26 and 27 thereof ranging from about 1 $\mu$m to. Also in grid fan 2, the layer 25 can have an index of refraction ranging from about 1.95 to 2.5.

In grid fan 2, each of the regions 28 is substantially equal in size to the other regions 28. The transverse thickness of each of the regions 28 between its faces 41 and 42 is generally uniform relative to the radial length thereof. Preferably, the regions 28 are all about equal in thickness to the thickness of the layer 25. Preferably, as in grid fan 2, each of the regions 28 has circumferentially opposed side edge portions such as 33 and 34 which radially extend continuously in adjacent relationship to center line 28 thereof. Thus, in grid fan 2, in each of the regions 28, the circumferential width at some given radial distance along center line 29 can be designated as $a$ between edge portions 33 and 34. Width $a$ continuously increases with increasing radial distances along the center line 29 from the common point Z. The circumferential width designated $b$ of the space 36 between each adjacent pair of regions 28 likewise increases with increasing radial distances from point Z.

In grid fan 2, layer 25 can be comprised of any convenient or desired light conductive material, such as glass or an organic polymer. When layer 25 is comprised of glass, regions 28 can be comprised of the same glass but with the refractive index altered by diffusion or ion implantation techniques, another glass, organic polymer or electro-optical crystal and when layer 25 is comprised of an organic polymer, regions 28 can be comprised of glass or electro-optical crystal The regions 28 are thus realized as impressed index of refraction variations in layer 25. Any convenient means for producing in layer 25 a more or less permanent spatially alternating periodic or even non-periodic modulation or alteration of the spectral characteristics of light conveyed in regions 28 may be employed.

The substrate 31 can be comprised of a material selected, for example, from the group consisting of glasses, metals, semiconductors, and organic polymers.

Grid fan 2 characteristically has a continuously variable grating constant whose value in any given instance is determined by the location and arrangement of the regions 28 in layer 25, other variables remaining constant. The variation range for the grating constant for grid fan 2 can thus be prescribed by the selection of the radii $r_1$ and $r_a$, where $r_1$ is the distance along each center line 29 from point Z to the position where each region 28 commences in layer 25, and $r_a$ is the distance along each center line 29 from point Z to the position where each region 28 terminates. Thus, over the range $(r_1 + r_a)$, /2 the grid fan 2 has a grating constant which belongs to a prechosen or prescribed center frequency.

Figure 2:
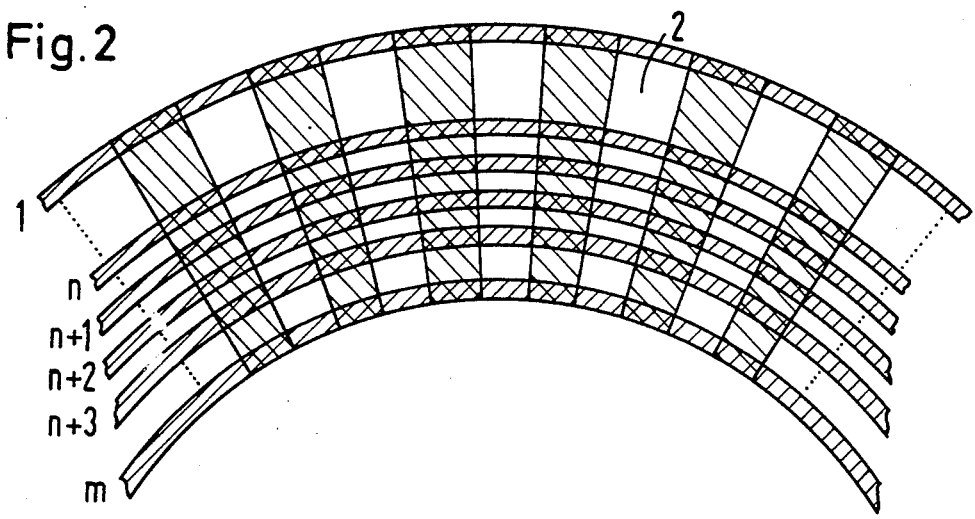
FIG. 2 is a fragmentary, diagrammatic plan view of another embodiment of optical waveguide apparatus of the present invention, such apparatus utilizing one embodiment of a grid fan of the present invention in combination with a plurality of waveguides.

Waveguide 1 has a width $c$ in the region of grid fan 2. Waveguide 1 is in the embodiment shown in FIGS. 1A and 1B located in such a way that it overlies, in adjacent relationship, face 26 of layer 25, and, consequently, also the faces 41 of regions 28. Also, waveguide 1 is oriented relative to grid fan 2 so as to traverse the side edge portions 33 and 34 of each region 28 vertically (perpendicularly). Thus, in the region where waveguide 1 overlies regions 28 of grid fan 2, waveguide 1 in this embodiment extends and is provided with a radius of curvature whose distance and center are measured from point Z. The waveguide 1 in the embodiment of FIGS. 1 and 2 is conveniently formed by known technique in a layer 37 of glass or the like. Layer 37 itself is supported in the usual way by a substrate 38 of glass or the like, substrate 38 having an index of refraction which is less than that of layer 37. The index of refraction of waveguide 1 is chosen so as to overlap upon the index of refraction of layer 25. Typically the index of refraction of waveguide 1 ranges from about 1.45 to 2.3.

By displacing the waveguide 1 in a radial direction $\times$ in relation to the grid fan 2, an arbitrarily desired grating constant can be selected from the value range $(a_{r_i} + b_{r_i})$ to $(a_{r_a} + b_{r_a})$. It is thereby possible to correct a deviation of the grating constant of grid fan 2 from an ideal (nominal) value in a simple way, whereby the mid (mean) grating constant $\frac{1}{2}(a_{r_i} + a_{r_a} + b_{r_i} + b_{r_a})$ of an integrated optical arrangement can correspond to the ideal (nominal) value which is to be realized in a given situation. The width a of the $a$ of the region 28 and the width $b$ of the space 36 are each so selected in a given instance of the embodiment of FIGS. 1A and 1B that the grid fan 2 modulates the light radiation conveyed in the waveguide 1 in a desired manner to a desired extent. A non-periodic arrangement for regions 28 analogous to the construction of macroscopic optical multilayer systems is thus also possible.

The radial displacement capability of the waveguide 1 relative the grid fan 2 is realized in the embodiment of FIGS. 1A and 1B due to the fact that the waveguide 1 and the grid fan 2 are each associated with respective separate substrates 38 and 31, respectively, which, preferably in conjunction with the utilization of a convenient immersion or glide fluid (not shown) are arranged in slidable face to face adjacent relationship with the smallest possible distance (interval) being maintainable therebetween. Examples of glide fluids include, for examples, oils, immersion oils, silicone fluids (e.g. Dow Corning 200 fluid).

The displacement capability of waveguide 1 relative to grid fan 2 is not necessary if a multiple concentric waveguide arrangement is used, as is schematically illustrated in the embodiment shown in FIG. 2, wherein a known waveguide switch (not shown) makes possible the control of light passage in and through the individual wave guides 1, $n$, $n+1$, $n+z$, $n+3$, and $m$ in the FIG. 2 embodiment. The embodiment of FIG. 2 can be constructed similarly to the embodiment of FIGS. 1A and 1B.

Figure 3:
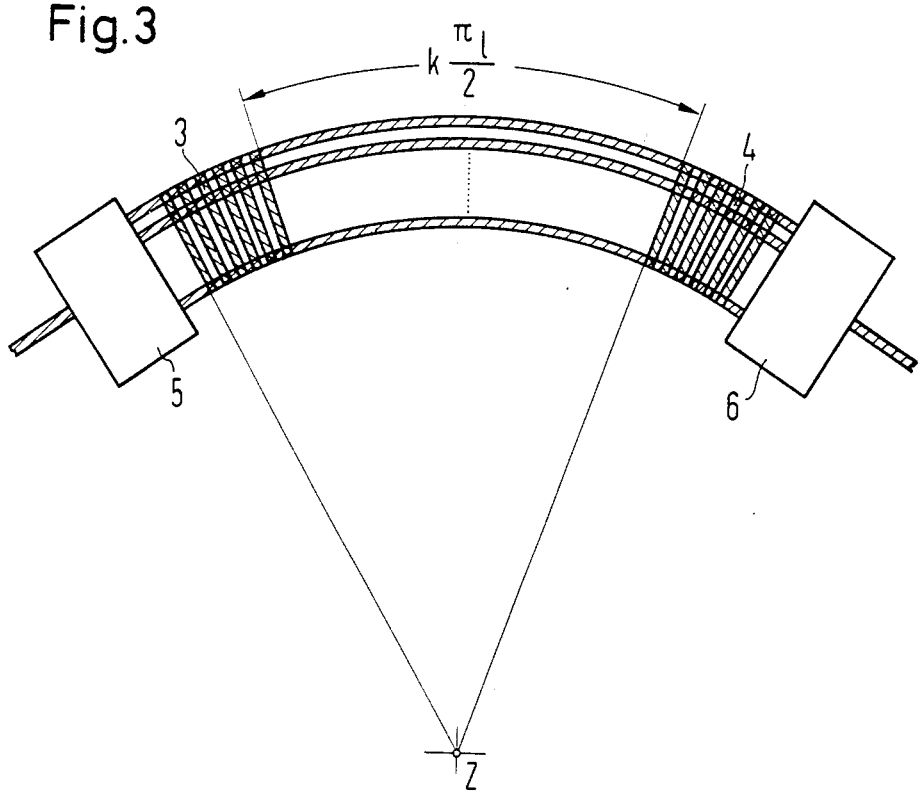
FIG. 3 is a fragmentary, diagrammatic plan view of still another embodiment of optical waveguide apparatus of the present invention, such apparatus utilizing two grid fans of the present invention in combination with a plurality of waveguides.

FIG. 3 illustrates schematically an embodiment wherein two embodiments each according to FIG. 2 are utilized. Here, two grid fans 3 and 4, respectively, each function as a light reflector. The distance from the face of one grid fan such as 3 to the adjacent face of the other grid fan such as 4 is chosen to be an integral mulitple of one half the light wave length $k \lambda 1/2$. Thus, this embodiment of FIG. 3 acts as a Fabry-Perot-Interferometer, and can be used as a couplable (switchable) narrow band light interference filter for integrated optical arrangements. This embodiment of FIG. 3 employs a known waveguide switch 5 and a known wave guidejunction arrangement 6.

In any given embodiment, one can employ individual known flexible waveguides, instead of the rigid waveguide multiple of $m$ concentrically arranged individual waveguides employed, for example, in the embodiment of FIG. 2. Use of flexible waveguides permits construction of a continuously tuneable integrated optical interference filter.

Figure 4:
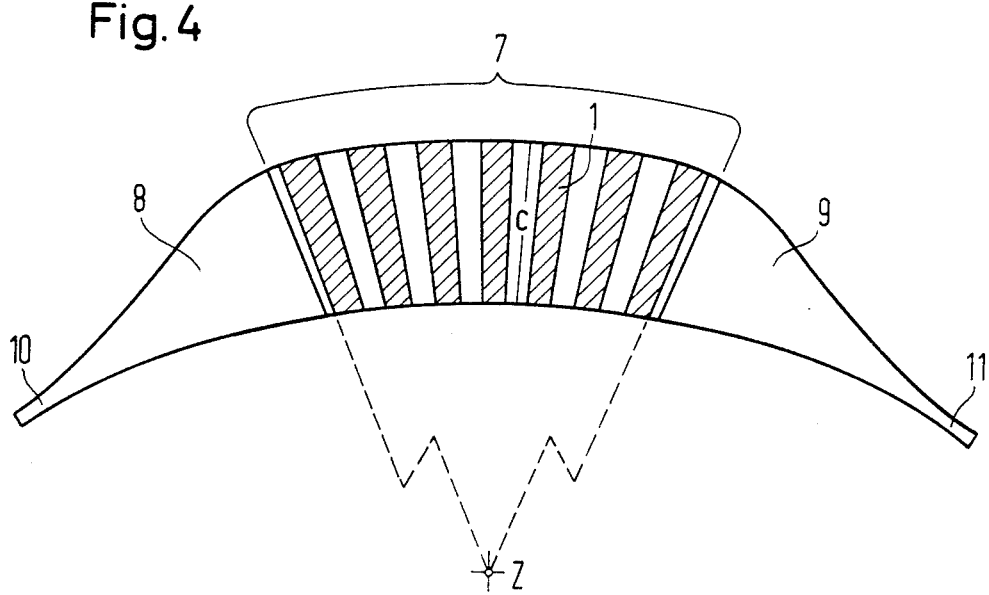
FIG. 4 is a fragmentary, diagrammatic plan view of yet another embodiment of optical waveguide apparatus of the present invention, said apparatus incorporating a grid fan of the present invention in combination with a laser active material.

The embodiment of FIG. 4 illustrates an additional application for a grid fan construction of the type, for example, shown in FIGS. 1A and 1B. The embodiment of FIG. 4 constitutes a so-called "distributed feedback laser". Here, a grid fan 2 is positioned adjacent a known laser active material 7. The laser active material 7 is functionally associated with known waveguide tapers 8 and 9 and with known passive waveguides 10 and 11 in known manner. The laser active material 7, here has a width $c$ which is chosen to be about equal to $(r_a - r_1)$ of grid fan 2. If a sufficient inversion for laser emission is produced in the laser active material by means of pumping in known manner, then those resulting inverted modes are caused to oscillate which find a suitable adapted (adjusted) resonator course within the fluorescence line width in the grid fan 2.

By combining two reflectors having laser active material, each reflector being produced by incorporating a grid fan therein, with light de-coupling (tubing out) via tapers, an integrated laser resonator is likewise constructable which is analogous to the known macroscopic lasers with end mirrors.

Although, with grid fans having spatially and temporally constant modulation of the spectral characteristics of the guided light in the case of reflectors, the optical strips widths $a$ and $b$, generally amount to an odd multiple of a quarter wave length, all other spacings and refraction index combinations of the fan strips are also possible analogous to macroscopic interference multiple layers.

If the grid strips are produced by means of application of a voltage to a fan-shaped arrangement of, for example, electrode fingers, in combination with an electro-optical material, which can be, for example, an electro-optical crystal or a liquid crystal, then in order to achieve as great an effect as possible, expanded zones which may possibly occur with a median refraction index (which zones lie between the ranges of maximal and minimal refractive indices) must exhibit expediently an optical zone width of a whole multiple of half the wave length.

Figure 5A:
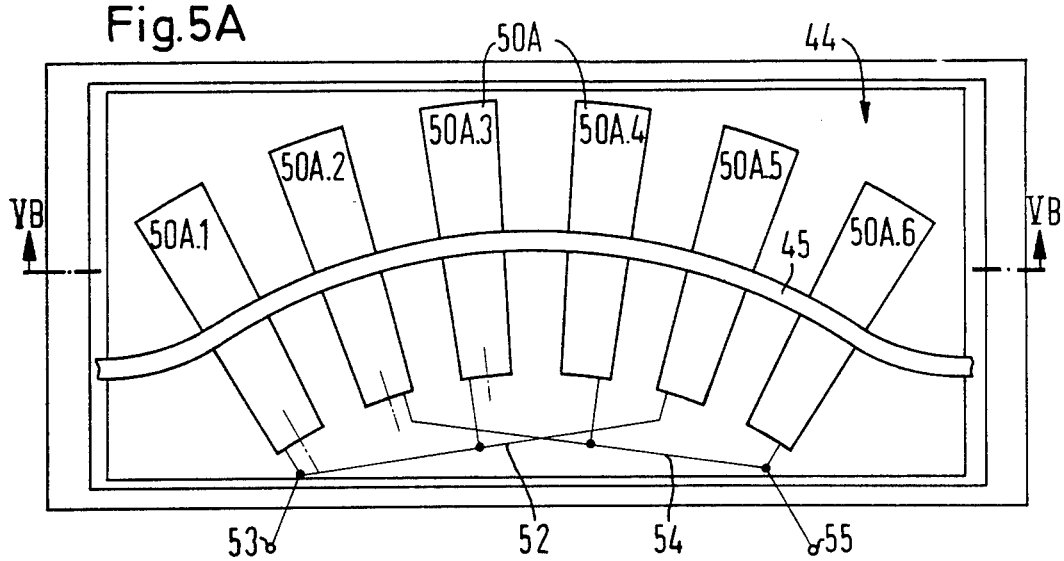
FIG. 5A is a fragmentary diagrammatic plan view of a further embodiment of optical waveguide apparatus of the present invention, such apparatus utilizing one embodiment of a grid fan of the present invention in combination with a waveguide.
Figure 5B:
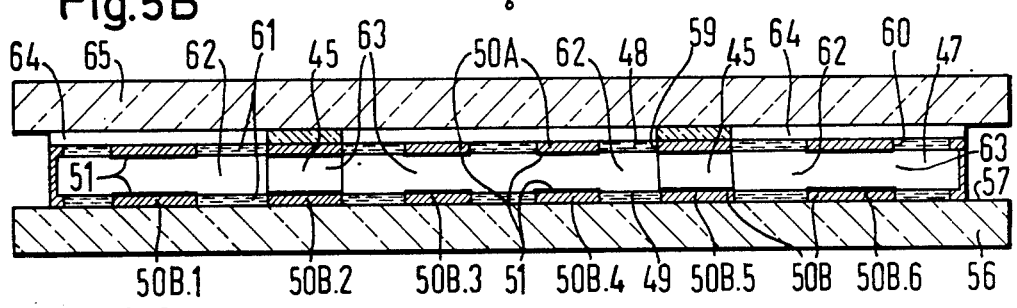
FIG. 5B is a vertical sectional view taken along the line 5B—5B of FIG. 5A.

In FIGS. 5A and 5B there is seen an embodiment of apparatus of this invention. Such apparatus employs as one sub-assembly thereof a grid fan arrangement which is herein designated in its entirety by the numeral 44. Grid fan 44 is shown in combination with a waveguide 45 which may be constructed similarly to waveguide 1. Grid fan 44 can be regarded as comprising a substantially planar, light transmissive continuous layer 47 having a pair of spaced, opposed, parallel faces 48 and 49. The layer 47 has a generally uniform index of refraction. Layer 47 is comprised of an electro-optical crystal which can be in a solid or liquid physical condition as those skilled in the art will appreciate.

A plurality of elongated electrode members 50 are provided. Each one of these electrode members 50 is located adjacent one of the faces 48 and 49. Each of these electrode members 50 generally has a hypothetical center line 51, all said center lines 51 being preferably adapted to extend approximately through a common point Y upon extrapolation. These electrode members 50 are generally and preferably placed so that at least one group thereof are in circumferentially spaced, adjacent, substantially co-planar relationship to one another all of the electrode members have substantially similar electrical properties and substantially similar indices of refraction relative to one another.

In the embodiment of FIGS. 5A and 5B a first group of electrode members, each member of such first group being designated as 50A in FIG. 5B is placed adjacent face 48 of layer 47, and a second group of electrode members, each member of such second group being designated as 5B in FIG. 5B is placed adjacent face 49 of layer 47. The electrode members 50A are so positioned relative to the electrode members 50B, that each one of the electrode members 50A is in spaced parallel relationship to a different one of the electrode members 50B.

Between each one of the electrode members 50 and the acjacent face 48 or 49 of layer 47, as the case may be, is interposed a dielectric insulation layer 51. Each such dielectric insulation layer has an index of refraction which is substantially lower than the index of refraction of layer 47.

Electrically conductive lead members 52 are provided which interconnect alternate set of electrode members 50A to a first common terminal 53 and, similarly, other electrically conductive lead members 54 are provided which interconnect another set of electrode members 50A to a second common terminal 55. Thus, in the embodiment of FIGS. 5A and 5B (but referring to FIG. 5A) the electrode members designated 50A 1, 50A.3, 50A.5 are electrically interconnected by lead members 52 to first terminal 53 and the electrode members designated 50A.2, 50A.4, and 50A.6 ar electrically interconnected by lead members 54 to second terminal 55. Electrically conductive lead members (not shown) are further provided which interconnect similarly the corresponding alternate set of electrode members 50B (designated 50B.1, 50B.3, and 50B.5 in FIG. 5B) to first terminal 53, and electrically conductive lead members (not shown) are further provided which interconnect similarly the other corresponding alternate set of electrode members 50B (designated 50B.2, 50B.4, annd 50B.6 in FIG. 5B) to second terminal 55.

Layer 47 is substantially planar, and is preferably, (as shown in FIGS. 5A and 5B) supported by a solid substrate 56. Substrate 56 has an index of refraction which is less than that of the layer 47. In grid fan 44, the layer 47 is a solid, and one of the faces thereof, here face 57 is adjacent surface 49 of the layer 47. In grid fan 44, the layer 47 can have a thickness transversely measured between the faces 48 and 49 thereof ranging from about 1μm to 1 mm. Also in grid fan 44, the layer 47 can have an index of refraction ranging from abohut 1.45 to 2.4. A fluid, such as silicone fluid can be used in the spaces 61 to fill in the gaps there with a material having a suitable index of refraction (e.g. ranging from about 1.45 to 2.5. )

In grid fan 44, each of the electrode members 50 is substantially equal in size to the other electrode members 50. The transverse thickness of each of the electrode members 50 between its faces 62 and 63 is generally uniform relative to the radial length thereof. Preferably, the electrode members 50 are all about equal in thickness. Preferably, in grid fan 44 each of the electrode members 50 has circumferentially opposed side edge portions, such as 59 and 60 which radially extend continuously in adjacent relationship to center line 51 thereof. Thus, in grid fan 44, in each of the electrode members 50, the circumferential width continuously increases with increasing radial distances along the center line 51 from the common point Y. The circumferential width of each space 61 between each adjacent pair of electrode members 50 likewise increases with increasing radial distances from point Y.

Any convenient material may be used for electrode members 50, such as copper, silver, aluminum, gold or the like. Any convenient size or spacing can be used for electrode members 50 with the limits of operability for a given chosen application situation.

When a suitable potential difference is applied (by known means not shown) between terminals 53 and 55, regions 63 are created in layer 47 between respective pairs of electrode members 50A and 50B. Each region 63 has an index of refraction which differs (that is, is greater or less than) the index of refraction of layer 47 in non-excited regions thereof (e.g. in the spaces 62 in layer 47 between the spaces 62). The shape and extent of each region 63 is determined by the pair of electrode members, such as 50A.1 and 50B.1, which define same. Each region 63 of grid fan 44 can be considered to be, in effect, analogous to the regions 28 of grid fan 2. The regions 63 are thus transitory in duration and extent (intensity), depending upon the electric filed used and the composition of layer 47.

Grid fan 44 characteristically has a continuously variable grating constant whose value in any given instance is determined by the location and arrangement of the regions 63 and the spaces 62 in layer 47, other variables remaining constant. The variation range for the grating constant for grid fan 44 can thus be prescribed by the system variables, such as refraction indices and film thickness. Waveguide 45 is oriented relative to grid fan 44 so as to traverse the side edge portions 59 and 60 of each electrode member 50 vertically (perpendicularly). Thus, in the region where waveguide 45 overlies members 50 of grid fan 44, waveguide 45 in this embodiment of FIGS. 5A and 5B extends, and is provided with, a radius of curvature whose distance and center are measured from point Y. The waveguide 45 in this embodiment is conveniently formed by known technique in the layer of electro-optical crystal. The index of refraction of waveguide 45 is chosen so as to overlap upon the index of refraction of layer 47. Typically the index of refraction of wave guide 45 ranges from about 1.45 to 2.5.

By displacing the waveguide 45 in a radial direction in relation to grid fan 44, an arbitrary desired grating can be selected, analogously to grid fan 2 and waveguide 1, using similar glide fluids.

Figure 5C:
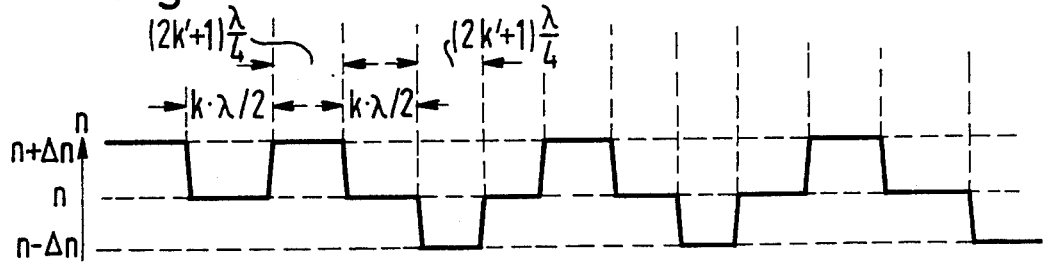
FIG. 5C is a plot illustrating the refractive index profile associated with the embodiment of FIGS. 5A and 5B.

FIG. 5C illustrates graphically the associated refractive index profile for an electro-optical crystal having an index $n$ in grid fan 44 for a reflector having an induced grid fan as shown in the embodiment of FIGS. 5A and 5B.

Figure 6A:
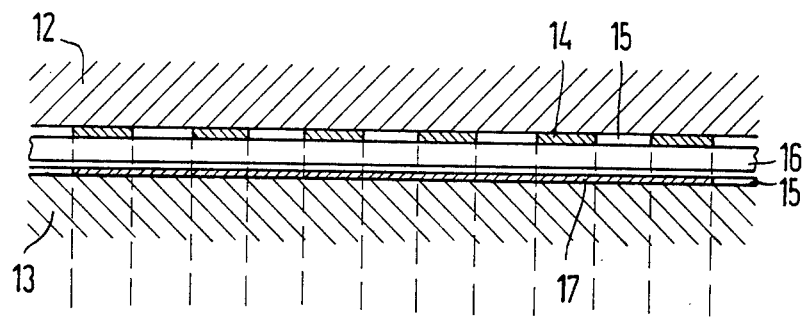
FIG. 6A is a fragmentary diagrammatic vertical sectional view of one further embodiment of optical waveguide apparatus of the present invention, such apparatus using one embodiment of a grid fan of the present invention in combination with a waveguide.
Figure 6B:
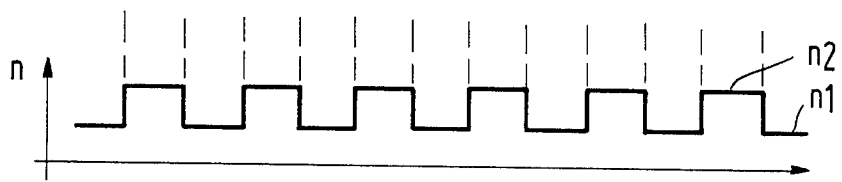
FIG. 6B is a plot illustrating the refractive index profile associated with the embodiment of FIG. 6A.

The total number of regions 28 in an embodiment of the type shown in FIGS. 1A and 1B, and the total number of electrode members 50A or 50B in an embodiment of the type shown in FIGS. 5A and 5B, can vary widely, though typically the number is in the range from about 50 to 1000. Also, the included angle subtended by the total number of regions 28 in an embodiment of the type shown in FIGS. 1A and 1B, and the included angle subtended by the total number of electrode members 50A or 50B in an embodiment of the type shown in FIGS. 5A and 5B can vary widely, though typically the included angle is in the range from about 0.5° to 20°. From an embodiment operability standpoint, the criteria used in determining these variables are as follows:

FIG. 6A illustrates an embodiment of a corresponding arrangement with a liquid crystal 16 as electro-optic material, in which, likewise, a refraction index profile is produced as shown in FIG. 6B by the electrodes 14. This embodiment employs a displaceable (adjustable) substrate 12., insulating layers 15., an areal (surface-) counter-electrode 14, and a substrate 13.

Figure 7:
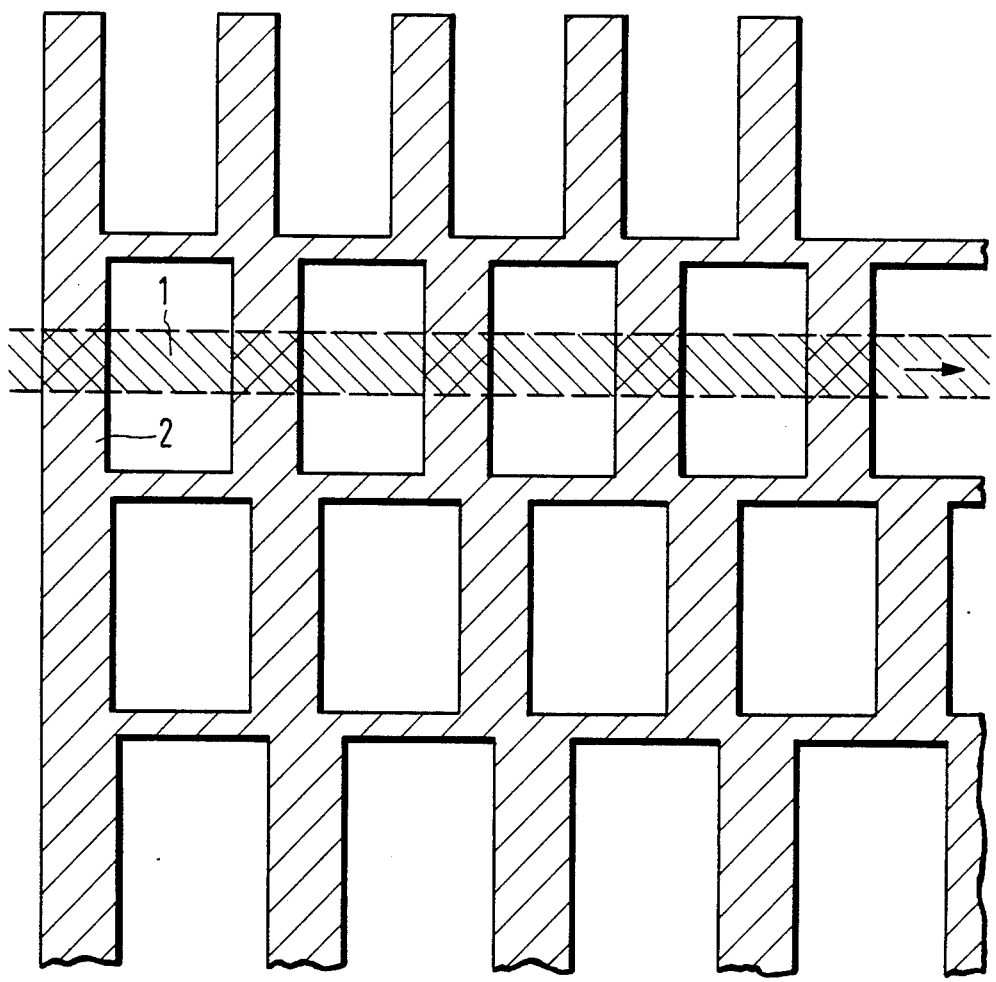
FIG. 7 is a fragmentary diagrammatic enlarged plan view of a still further embodiment of optical waveguide apparatus of the present invention, such apparatus utilizing one embodiment of a grid fan of the present invention in combination with a waveguide.

In another embodiment, the fan expansion of the grid fan can take place in distinct steps, as is illustrated in FIG. 7. In this case, the respective waveguide paths (courses) of the waveguide 1 below the electrode arrangement 14 are straight in their course, so that here, too, the ends (borders) of the fan elements are cut vertically by the waveguide. In this embodiment, each fan element is interconnected to every other fan element by sections.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

According to FIG. 1A and FIG. 1B a layer 25 of CAS10- glass (refractive index 1.47 for the wavelength 632.8 nm of the HeNe-laser) is evaporation deposited on a polished quartz glass substate 31 (refractive index 1.46). Grating strips 28 are formed by depositing $Al_2O_3$ (refractive index 1.62) in etched grooves of the layer 25 by using photolithography or electron lithography, subsequent sputter etching and evaporation techniques. Layer 37 is made of CAS10-glass and evaporation deposited on the polished underside of the quartz plate 38. Using again photolithography ( electron lithography, etching and evaporation, the waveguie 1 ($ZrO_2$, refractive index 1.88) is formed. Typical dimensions are a=b, ranging from 0.25 μm to 0.37 μm, $r_a-r_1$ = 100 μm and c = 5 μm. About 100 grating strips are used.

In the second example (FIGS. 5A and 5B) the dimensions are similar to the first example (FIGS. 1A and 1B). In a thin slab of the electro-optical crystal $LiNbO_3$ (refractive index about 2.2) 47a waveguide 45 is formed by outdiffusion technique. The slab is then sandwiched between two identical electrode configurations 50A resp. 50B. These grating strips are evaporated gold layers 50 on quartz glass substrates 56 and 65. The grating strips are separated by insulating CAS-10 glass 51. Silicone oil is used in the spaces 61.

We claim:
1. Apparatus adapted for utilization in optical waveguide systems comprising
   A. a substantially planar light transmissive continuous layer having a pair of spaced, opposed, parallel faces, said layer having a generally uniform index of refraction, and
   B. a plurality of elongated regions are each defined in said layer,
      1. each one of said regions generally having a hypothetical center line, all said center lines being adapted to extend through a common point upon extrapolation,
      2. said regions being generally in circumferentially spaced, adjacent substantially co-planar relationship to one another, and
      3. each one of said regions having an index of refraction which is either greater than or less than the index of refraction of said layer, all of said regions having a substantially similar index of refraction relative to one another.
2. The apparatus of claim 1 wherein said layer is supported by a solid substrate, said substrate having an index of refraction which is less than that of said layer.
3. The apparatus of claim 2 wherein said layer is a solid and one of said faces thereof is continuously adhered to a substantially planar surface of said substrate.
4. The apparatus of claim 1 wherein said layer has a thickness transversely measured between said faces ranging from about 1μm to 1mm.
5. The apparatus of claim 4 wherein said layer has an index of refraction ranging from about 1.45 to 2.3.
6. The apparatus of claim 1 wherein each of said regions is substantially equal in size to the others thereof.
7. The apparatus of claim 1 wherein the thickness of each of said regions is generally uniform relative to the radial length thereof.
8. The apparatus of claim 1 wherein said regions are all about equal in thickness to the thickness of said layer.
9. The apparatus of claim 1 wherein, in each of said regions, the circumferentially opposed side edge portions thereof radially extend continuously.
10. The apparatus of claim 9 wherein, in each of said regions, the circumferential width thereof continuously increases with increasing radial distance along said center line thereof from said common point.
11. The apparatus of claim 1 wherein, in each of said regions, the circumferentially opposed side edge portions thereof radially extend in segments.
12. The apparatus of claim 11 wherein radially spaced sections interconnect each circumferentially adjacent pair of said regions, each section having a substantially similar index of refraction relative to said regions.
13. The apparatus of claim 1 wherein said layer is comprised of glass.
14. The apparatus of claim 13 wherein said regions are comprised of
   the same glass with altered refractive index, or of another glass, organic polymer, electro-optical crystal
15. The apparatus of claim 1 wherein said layer is comprised of a solid electro-optical crystal.
16. The apparatus of claim 1 wherein said layer is comprised of a liquid crystal.
17. The apparatus of claim 1 wherein said layer is comprised of an organic polymer.
18. The apparatus of claim 17 wherein said regions are comprised of glass or electro-optical crystal.
19. The apparatus of claim 1 wherin a waveguide is located adjacent one of said faces and is oriented relative to said regions so as to extend thereacross.
20. The apparatus of claim 19 wherein a plurality of said waveguides are each so located and so oriented.
21. The apparatus of claim 20 wherein said waveguides are concentrically arranged relative to one another with respect generally to said common point.
22. Apparatus adapted for utilization in optical waveguide systems comprising
   A. a substantially planar light transmissive continuous layer having a pair of spaced, opposed, parallel faces, said layer
      1. having a generally uniform index of refraction,
      2. being comprised of a material selected from the group consisting of glasses and organic polymers,
   B. a plurality of elongated regions are each defined in said layer,
      1. each one of said regions generally having a hypothetical center line, all said center lines being adapted to extend through a common point upon extrapolation,
      2. said regions being generally in circumferentially spaced, adjacent, substantially co-planar relationship to one another,
      3. each one of said regions having an index of refraction which is either greater than or less than the index of refraction of said layer, all of said regions having a substantially similar index of refraction relative to one another, and
      4. each one of said regions being comprised of glass is electro-optical crystal
   C. a solid substrate
      1. having an index of refraction which is less than that of said layer,
      2. having a surface with portions thereof
         a. contacting one of said faces
         b. supporting said layer and said regions thereon in said substantially planar configuration, and
         c. adhering to said one face,
      3. being comprised of a material selected from the group consisting of glasses, metals, semiconductors, and organic polymers.
23. The apparatus of claim 22 wherein a waveguide is located adjacent one of said faces and is oriented relative to said regions so as to extend thereacross.
24. The apparatus of claim 23 wherein a plurality of said waveguides are each so located and so oriented.
25. The apparatus of claim 24 wherein said waveguides are concentrically arranged relative to one another with respect generally to said common point.
26. Apparatus adapted for utilization in optical waveguide systems comprising
   A. a substantially planar light transmissive continuous layer having a pair of spaced, opposed, parallel faces, said layer
      1. having a generally uniform index of refraction in its relaxed state
      2. being comprised of a material selected from the group consisting of electro optical solid crystals and electro-optical liquid crystals,

B. a plurality of elongated electrode members,
1. each one of said electrode members being located adjacent one of said faces,
2. each one of said electrode members generally having a hypothetical center line, all said center lines being adapted to extend through a common point upon extrapolation,
3. said electrode members being generally in circumferentially spaced, adjacent substantially co-planar relationship to one another,
4. each one of said electrode members being comprised of at least one metal selected from the group consisting of copper, silver, gold, and aluminum,
5. said electrode members being interconnected together by electrode bead means, and
C. a solid substrate
1. having an index of refraction which is less than that of said layer 2. having a surface with portions thereof
a. supporting said layer and said electrode members,
b. maintaining said layer in said substantially planar configuration, and
c. adhering to portions of said layer and said electrode member contacted therewith.

27. The apparatus of claim 26 wherein a waveguide is located adjacent one of said faces and is oriented relative thereto so as to extend across said electrode members.

28. The apparatus of claim 27 wherein a plurality of said waveguides are each so located and so oriented.

29. The apparatus of claim 28 wherein said waveguides are concentrically arranged relative to one another with respect generally to said common point.

* * * * *